US011917350B2

(12) United States Patent
Wilk et al.

(10) Patent No.: US 11,917,350 B2
(45) Date of Patent: Feb. 27, 2024

(54) LOUDSPEAKER HAVING COLLAPSIBLE LEAD WIRE

(71) Applicant: Apple Inc., Cupertino, CA (US)

(72) Inventors: Christopher Wilk, Los Gatos, CA (US); Logan A. Rotolo, San Francisco, CA (US); Anthony P. Grazian, Mountain View, CA (US); Onur I. Ilkorur, Campbell, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 17/409,485

(22) Filed: Aug. 23, 2021

(65) Prior Publication Data

US 2022/0095026 A1 Mar. 24, 2022

Related U.S. Application Data

(60) Provisional application No. 63/082,384, filed on Sep. 23, 2020.

(51) Int. Cl.

| | |
|---|---|
| ***H04R 9/06*** | (2006.01) |
| ***H04R 1/06*** | (2006.01) |
| ***H04R 7/04*** | (2006.01) |
| ***H04R 9/04*** | (2006.01) |
| ***H04R 9/02*** | (2006.01) |

(52) U.S. Cl.

CPC ................. *H04R 1/06* (2013.01); *H04R 7/04* (2013.01); *H04R 9/025* (2013.01); *H04R 9/046* (2013.01); *H04R 9/06* (2013.01); *H04R 2499/11* (2013.01)

(58) Field of Classification Search

CPC . H04R 1/06; H04R 7/04; H04R 9/025; H04R 9/046; H04R 9/06; H04R 2499/11

See application file for complete search history.

(56) References Cited

U.S. PATENT DOCUMENTS

| | | | | |
|---|---|---|---|---|
| 4,088,847 A | 5/1978 | Yukimoto et al. | | |
| 6,072,886 A * | 6/2000 | Frasl | H04R 9/02 | 381/409 |
| 6,553,126 B2 * | 4/2003 | Han | H04R 9/06 | 381/409 |
| 7,630,508 B2 * | 12/2009 | Honda | H04R 1/06 | 381/396 |
| 9,794,666 B1 | 10/2017 | Beverly | | |
| 2001/0009585 A1 * | 7/2001 | Masuda | H04R 13/00 | 381/423 |
| 2004/0105564 A1 * | 6/2004 | Kuwabara | H04R 9/06 | 381/345 |
| 2017/0339478 A1 * | 11/2017 | Xiao | H04R 1/06 | |
| 2018/0288550 A1 | 10/2018 | Guthy et al. | | |
| 2021/0235196 A1 * | 7/2021 | Cheng | H04R 9/046 | |

* cited by examiner

*Primary Examiner* — Huyen D Le

(74) *Attorney, Agent, or Firm* — Aikin & Gallant, LLP

(57) ABSTRACT

A loudspeaker having a compressible lead wire is described. The lead wire carries an electrical audio input signal to a voice coil. The electrical audio input signal drives the voice coil to oscillate in an axial direction. The compressible lead wire includes an elastic portion that stretches and compresses in the axial direction to allow the voice coil to oscillate freely. The elastic portion includes several compressible elements that are located within a cavity of the loudspeaker. The compressible elements extend through the cavity in the axial direction. Other aspects are also described and claimed.

20 Claims, 6 Drawing Sheets

LOADSPEAKER HAVING COLLAPSIBLE LEAD WIRE

This application claims the benefit of priority of U.S. Provisional Patent Application No. 63/082,384, filed on Sep. 23, 2020, and that patent application is incorporated herein by reference.

BACKGROUND

Field

Aspects of the disclosure are related to a loudspeaker, including a loudspeaker having lead wires to carry an electrical audio input signal to a voice coil.

Background Information

Form factors of mobile electronic devices, such as mobile smartphones, continue to decrease in order to meet consumer demands for portability. As the form factors decrease, device enclosures become smaller and the space for internal components is reduced. Consequently, the space available for a loudspeaker within the device enclosure is reduced, and compactness of the loudspeaker becomes even more critical to meeting design needs.

A loudspeaker includes one or more speaker drivers, e.g., electromagnetic transducers that convert an electrical audio input signal into an emitted sound. Typically, loudspeakers include a voice coil that moves a diaphragm. More particularly, an electrical audio input signal is applied to the voice coil, which interacts with a magnet to generate a mechanical force that moves the voice coil, and hence, the diaphragm that is coupled to the voice coil. The moving diaphragm has a radiating surface to generate sound when it is moved by the voice coil. The electrical audio input signal is typically applied to the voice coil by a lead wire that interconnects the voice coil with an input terminal of the loudspeaker. When the electrical audio input signal is applied to the input terminal, it is carried to the voice coil by the lead wire. Accordingly, an end of the lead wire that is connected to the voice coil can move as the voice coil moves.

SUMMARY

Existing loudspeakers have lead wires that are typically long and curved to make the lead wire flexible enough to bend when the voice coil moves. The length and shape of the lead wire may require that it be routed through the loudspeaker so that additional space is required within a speaker enclosure, e.g., to route the lead wire among the other internal components of the loudspeaker. Therefore, the lead wire either necessitates a larger speaker footprint than would otherwise be necessary, or takes up space that could otherwise be occupied by other components, such as magnets of a motor system of the loudspeaker. As a result, existing loudspeakers may not be optimally compacted or may not have components optimally sized for acoustic performance. Furthermore, the long and curved lead wires of existing loudspeakers typically have a single bend location where the wire bends back around a magnet. Bending stresses are localized in that single location when the voice coil moves. As a result, existing loudspeakers may not optimally distributes stress within the lead wire, which can result in lead wire failure.

A loudspeaker, and electronic devices incorporating the loudspeaker, are described. In an aspect, the loudspeaker has a compressible lead wire. The compressible lead wire delivers an electrical audio input signal to a voice coil of a motor system. The motor system includes a center magnet and one or more side magnets, and when the input signal is applied to the voice coil, the magnets interact with the electrical signal to drive the voice coil. A diaphragm coupled to the voice coil also moves in an axial direction to generate sound. In an aspect, the lead wire has an elastic portion that includes several compressible elements. The compressible elements are configured to extend and compress in the axial direction when the voice coil and the diaphragm move.

In an aspect, the elastic portion of the lead wire is a helical portion. The helical portion can have several helical turns. The helical turns are the compressible elements that expand and contract when the voice coil and the diaphragm move in the axial direction. Accordingly, the helical portion allows the voice coil to oscillate freely. The helical portion can have a constant diameter. Alternatively, the helical portion can include a conic helical portion having turns that have different diameters.

In an aspect, the elastic portion extends vertically within a cavity of a speaker housing of the loudspeaker. The cavity is defined between the speaker housing, the voice coil, and the one or more side magnets. The elastic portion is contained within the cavity, and thus, the elastic portion is not routed through a gap that would otherwise be required between the speaker housing and one of the side magnet(s). More particularly, the lead wire does not extend through such a gap. Accordingly, the speaker housing can be compacted to close the gap or the side magnet(s) can be enlarged to fill the gap.

In an aspect, the loudspeaker includes several lead wires that are spaced around the voice coil. The several lead wires can be evenly spaced around the voice coil. For example, the speaker housing can be rectangular, and an elastic portion of each of the several lead wires can be located within a respective cavity at a respective corner. Accordingly, the several lead wires can distribute loads from the moving voice coil and the diaphragm.

Other speaker designs follow from the description below. For example, the loudspeaker can have a hole in the center magnet. The hole can extend axially through the center magnet, and can provide the cavity to receive the elastic portion of a lead wire.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
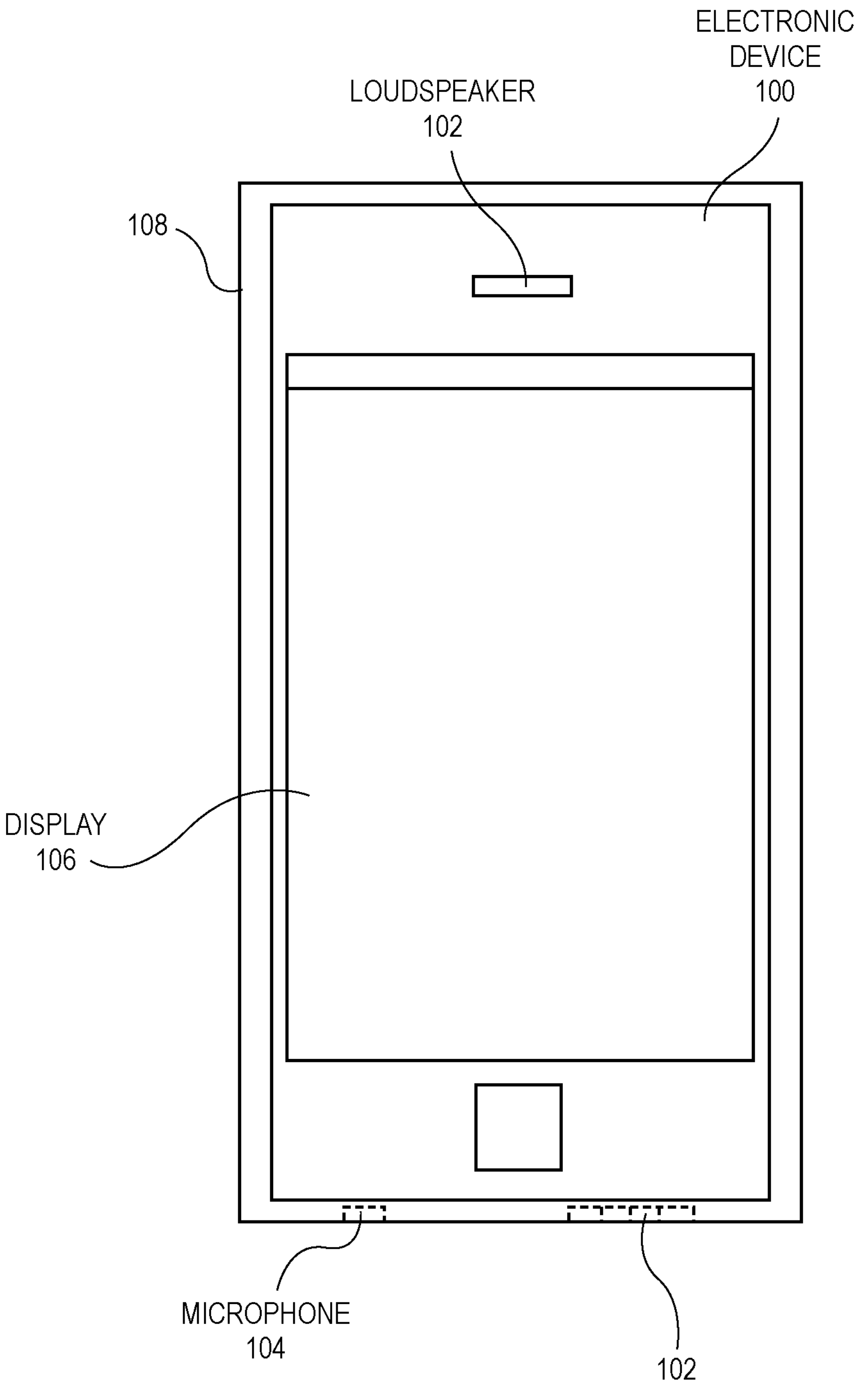
FIG. 1 is a pictorial view of an electronic device, in accordance with an aspect.

Aspects describe a loudspeaker having a compressible lead wire. The compressible lead wire can include an elastic portion that can carry an electrical audio input signal to a voice coil, and can expand and contract to allow the voice coil to oscillate freely when driven by the input signal. The elastic portion may be located such that an internal space of the loudspeaker is efficiently utilized. The loudspeaker can be incorporated into an electronic device, such as a mobile device. In an aspect, the mobile device can be a smartphone. In other aspects, the electronic device can be another device for playing audio to a user, such as a desktop computer, a laptop computer, a headset, etc.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "above" may indicate a location in a first direction away from a reference point. Similarly, "below" may indicate a location in a second direction away from the reference point and opposite to the first direction. Such terms are provided to establish relative frames of reference, however, and are not intended to limit the use or orientation of a loudspeaker to a specific configuration described in the various aspects below.

In an aspect, a loudspeaker includes a lead wire having an elastic portion within a cavity of a speaker housing. For example, the elastic portion can be expandable and compressible in an axial direction, e.g., vertically. Extension and contraction of the elastic portion is provided by several compressible elements. The compressible elements can be elastic, and they may be foldable. For example, the elastic portion can include a helical portion having a top turn above a bottom turn. The turns of the helical portion can compress and extend such that the elastic portion acts like a spring when the voice coil is driven vertically up and down within a magnetic gap by an electrical audio input signal applied to the voice coil by the lead wire. The elastic portion can be contained within the cavity, rather than being routed between the speaker housing and magnet(s) of the loudspeaker. Accordingly, an overall form factor of the loudspeaker can be reduced, making the loudspeaker more compact. Alternatively, or additionally, locating the elastic portion within the cavity rather than routing the lead wire between the magnet(s) and the speaker housing can provide more space for the magnet(s). Accordingly, the magnets can be enlarged, which can improve acoustic performance of the loudspeaker. Furthermore, stresses that occur within the lead wire during loudspeaker operation can distribute uniformly over an entire length of the compressible elements, rather than in a single location as in existing loudspeakers. The uniform stress distribution can result in lower localized stresses, which can reduce a likelihood of failure of the lead wire during operation.

Referring to FIG. 1, a pictorial view of an electronic device is shown in accordance with an aspect. An electronic device 100 may be a mobile device, such as a smartphone. Alternatively, the electronic device 100 could be any other portable or stationary device or apparatus incorporating a loudspeaker 102. For example, electronic device 100 can be a laptop computer or a tablet computer. The electronic device 100 can include various capabilities to allow a user to access features involving, for example, calls, voicemail, music, email, Internet browsing, scheduling, and photos. For example, the electronic device 100 may include cellular network communication circuitry. An integrated microphone 104 can pick up the voice of a user during a call, and the loudspeaker 102 may deliver a far-end voice to the near-end-user during the call. The loudspeaker 102 may also emit sounds associated with music files played by a music player application running on the electronic device 100. A display 106 may be integrated within a device housing 108 to present the user with a graphical user interface to allow the user to interact with the electronic device 100 and applications running on the electronic device.

The electronic device 100 may have a footprint in a transverse direction that allows the user to grip the electronic device comfortably. Furthermore, the electronic device 100 can have a thin profile. Accordingly, the electronic device 100 may have limited internal space to contain device components, such as the loudspeaker 102 or the microphone 104.

Figure 2:
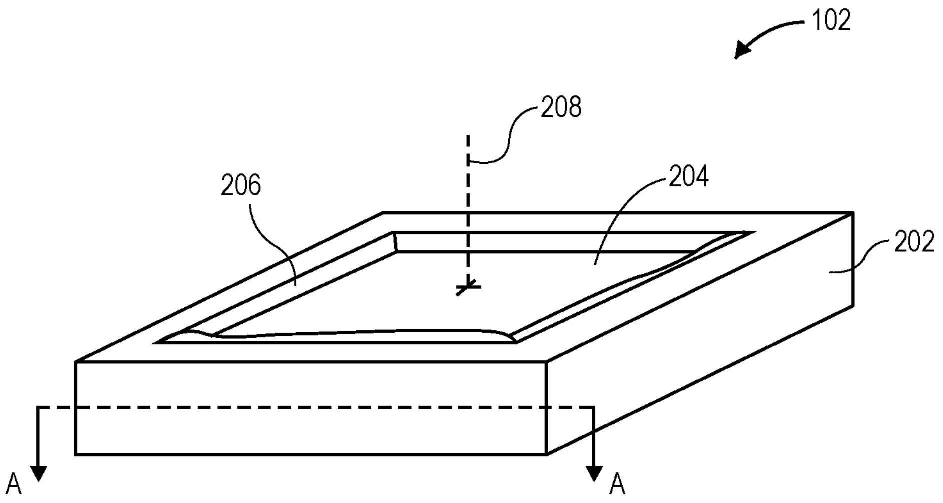
FIG. 2 is a perspective view of a loudspeaker, in accordance with an aspect.

Referring to FIG. 2, a perspective view of a loudspeaker is shown in accordance with an aspect. The loudspeaker 102 may be contained within an internal volume of the device housing 108. For example, the loudspeaker can be a microspeaker coupled to the device housing 108 such that sound emitted by the loudspeaker 102 is directed outward from the electronic device 100 to a surrounding environment. More particularly, the loudspeaker 102 can have a speaker housing 202 coupled to the device housing 108. A diaphragm 204 within the speaker housing 202 can be coupled to the speaker housing 202 by a surround 206 that flexes to allow the diaphragm 204 to move along a central axis 208 relative to the speaker housing 202. As the diaphragm 204 oscillates along the central axis 208, the loudspeaker 102 generates sound.

Figure 3:
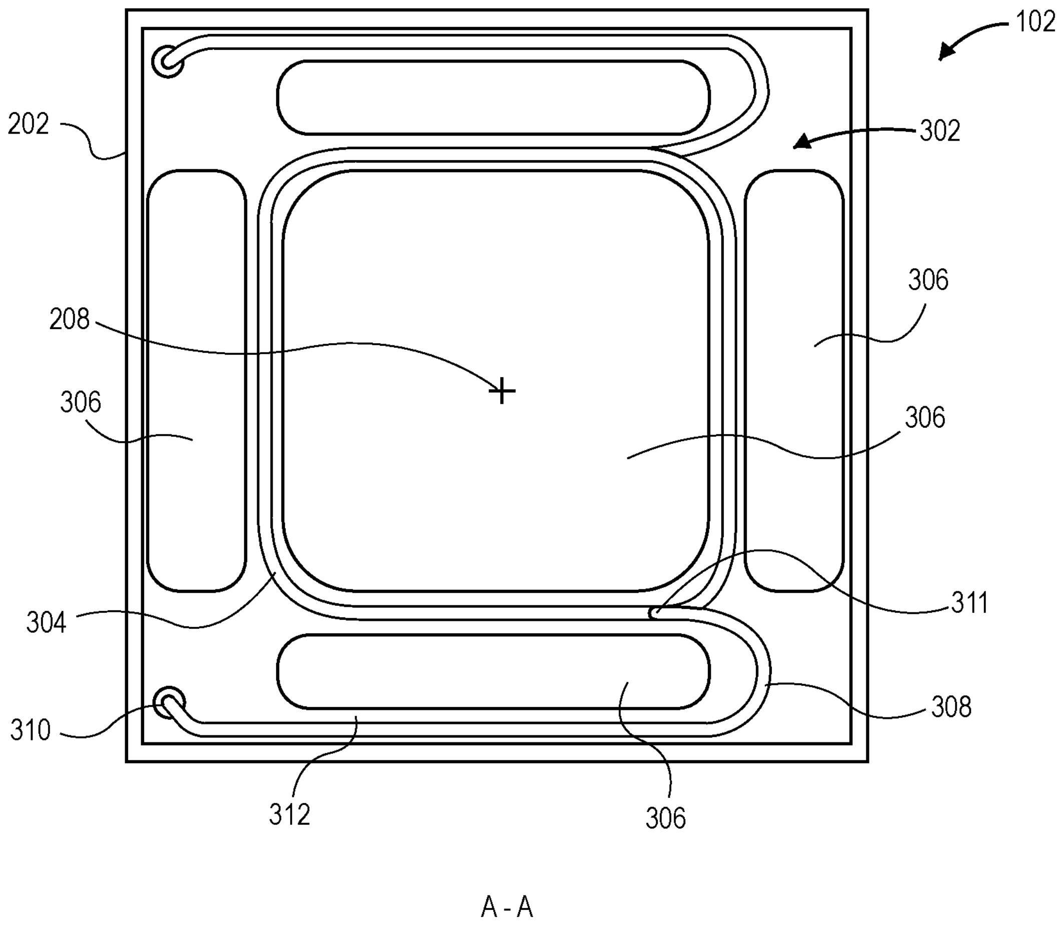
FIG. 3 is a cross-sectional view, taken about line A-A of FIG. 2, of a loudspeaker motor system, in accordance with an aspect.

Referring to FIG. 3, a cross-sectional view, taken about line A-A of FIG. 2, of a loudspeaker motor system is shown in accordance with an aspect. The loudspeaker 102 can include a motor system 302 contained within the speaker housing 202. Motor system 302 can cause motion of the diaphragm 204 for sound generation. For example, motor system operation can drive the diaphragm 204 to oscillate in an axial direction along the central axis 208. In an aspect, the motor system 302 includes a voice coil 304 coupled to the diaphragm 204 (not shown in FIG. 3). An electrical audio input signal applied to the voice coil 304 can interact with one or more magnets 306 to cause the voice coil 304 to move. In an aspect, the electrical audio input signal is applied to the voice coil 304 through a lead wire 308.

The lead wire 308 can have a fixed end 310 coupled to the speaker housing 202 and a moving end 311 coupled to the voice coil 304. The length of the lead wire 308 between the fixed end 310 and the moving end 311 may be sufficient to impart flexibility that allows the lead wire 308 to flex as the voice coil 304 oscillates along the central axis 208. More particularly, the length of the lead wire 308 may be predetermined to ensure that the lead wire 308 can move upward and downward, along with the voice coil 304, without experiencing high stress or fracture. In an aspect, a portion of the lead wire may loop behind a magnet 306 of the motor system 302. More particularly, the lead wire 308 may extend through a gap 312 defined radially between the magnet 306 and the speaker housing 202. The gap 312 must be at least as wide as the lead wire 308, and actually may be slightly larger, to allow the lead wire 308 to move freely without rubbing against the speaker housing 202 or the magnet 306. For example, the gap 312 between the magnet 306 and the speaker housing 202 may be approximately 0.5 millimeter. The routing of the cantilevered lead wire 308 may require the gap 312 in order for the lead wire 308 to be wrapped behind the magnet 306. Thus, the routing of the lead wire 308 may necessitate an increase in a transverse footprint (within a plane orthogonal to the central axis 208) of the speaker housing 202 and/or a decrease in a width of the magnet 306. Such accommodations can result in a less compact loudspeaker or a loudspeaker with reduced acoustic performance.

Figure 4:
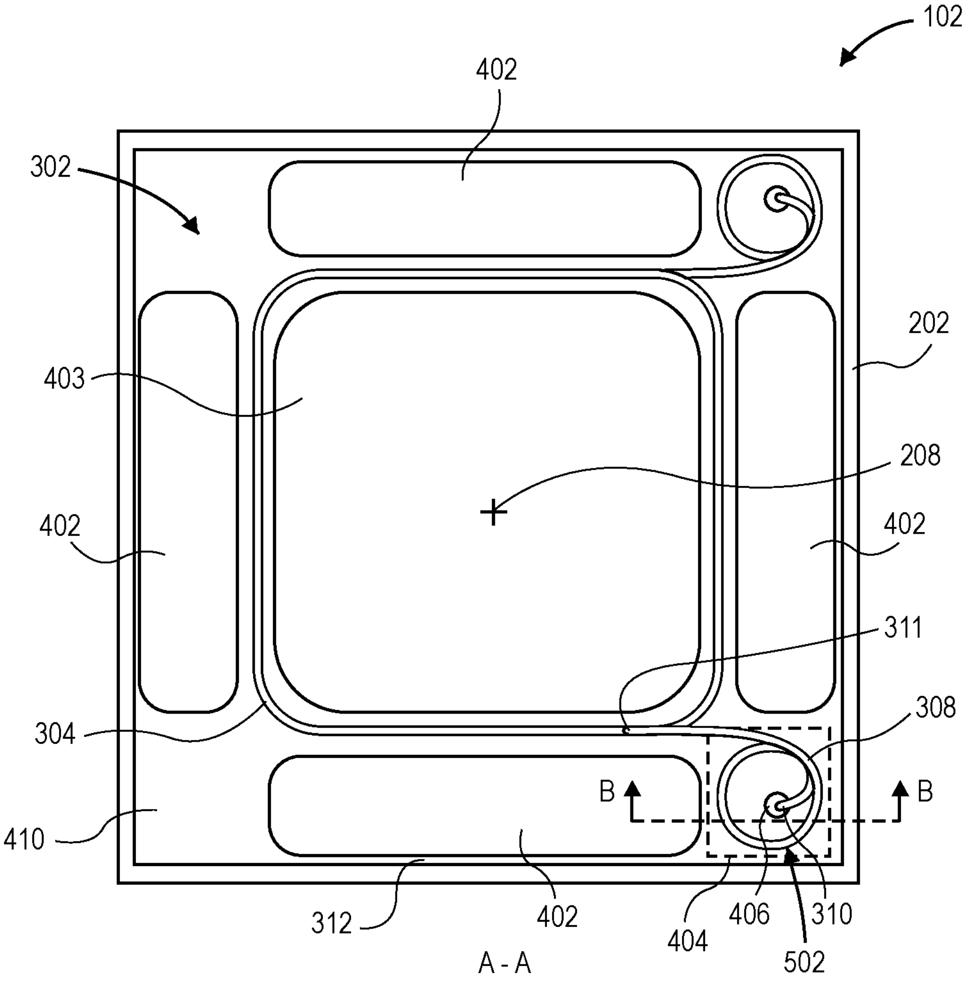
FIG. 4 is a cross-sectional view, taken about line A-A of FIG. 2, of a loudspeaker motor system, in accordance with an aspect.

Referring to FIG. 4, a cross-sectional view, taken about line A-A of FIG. 2, of a loudspeaker motor system is shown in accordance with an aspect. As described above, the motor system 302 of the loudspeaker 102 can include one or more magnets 306. For example, the motor system 302 can include one or more side magnets 402 extending around the voice coil 304. The side magnets 402 can be located radially outward from the voice coil 304. There may be four side magnets 402 around the voice coil 304, as shown in FIG. 4, or alternatively, there may one (FIG. 8), two, three, or any other number of side magnets 402. The side magnets 402 may be arranged in a rectangular layout in the case of a rectangular voice coil, or alternatively, the side magnets 402 could be laid out in a triangular, circular, or other profile to match a differently-shaped voice coil 304.

The motor system 302 can include a center magnet 403. The center magnet 403 can be radially inward from the side magnets 402. For example, the center magnet 403 may be on the central axis 208 and the side magnets 402 may be distributed about the central axis 208 around the center magnet 403. Similarly, the center magnet 403 can be radially inward from the voice coil 304. The center magnet 403 can be coaxial with the voice coil 304 along the central axis 208. Accordingly, the voice coil 304 can be located within a magnetic gap formed radially between the center magnet 403 and the one or more side magnets 402. The voice coil 304 can oscillate in the axial direction, e.g., vertically along the central axis 208, within the magnetic gap to drive the diaphragm 204 and generate sound.

In an aspect, the loudspeaker 102 makes optimal use of its internal space by routing the lead wire 308 such that the lead wire 308 does not extend through the gap 312 defined radially between one or more side magnets 402 and the speaker housing 202. Rather, the lead wire 308 is routed from the fixed end 310 at the speaker housing 202 to the moving end 311 at the voice coil 304 without passing between any side magnet 402 of the motor system 302 and the speaker housing 202. For example, the lead wire 308 can extend through a cavity 404 that is not between the side magnet(s) 402 and the speaker housing 202. The cavity 404 can be defined in the transverse direction between the speaker housing 202, the voice coil 304, and one or more side magnets 402. The cavity 404 can extend vertically between a top wall of the speaker housing 202 (not shown) and a bottom wall 410 of the speaker housing 202.

In an aspect, the lead wire 308 includes an elastic portion 502 that extends through the cavity 404 in the axial direction, e.g., vertically (upward or downward). For example, the elastic portion 502 can extend vertically through the cavity 404 to connect a portion of the lead wire 308 at the fixed end 310 to a portion of the lead wire 308 at the moving end 311. The fixed end 310 can be secured to the speaker housing 202 with a damping glue, and welded to a speaker terminal 406. Similarly, the moving end 311 of the lead wire 308 can be connected, physically and electrically, to the voice coil 304. Accordingly, the electrical audio input signal can be delivered from a processor of the loudspeaker 102 through the speaker terminal 406 to the lead wire 308. The lead wire 308 can carry the electrical audio input signal, including vertically through the elastic portion 502 in the cavity 404, to the voice coil 304 to generate sound.

Figure 5:
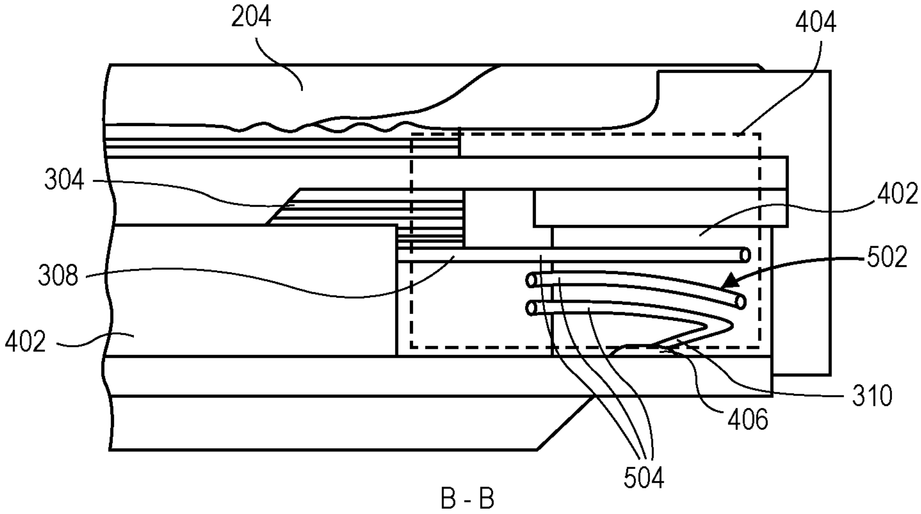
FIG. 5 is a partial cross-sectional view, taken about line B-B of FIG. 2, of a loudspeaker motor system, in accordance with an aspect.
Figure 6A:
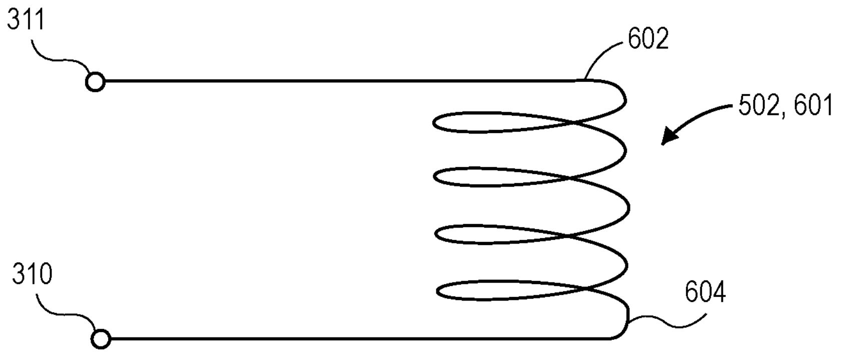
FIGS. 6A-6C are side views of a lead wire of a loudspeaker, in accordance with several aspects.
Figure 6B:
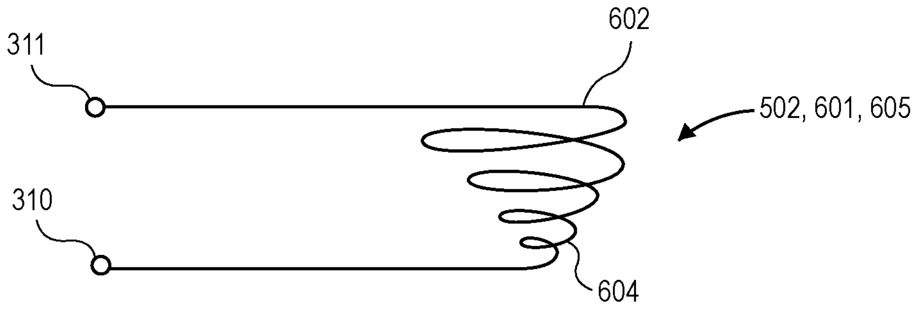

Referring to FIG. 5, a partial cross-sectional view, taken about line B-B of FIG. 2, of a loudspeaker motor system is shown in accordance with an aspect. The elastic portion 502 of the lead wire 308 within the cavity 404 can have a plurality of compressible elements 504 configured to extend and compress in the axial direction. More particularly, the compressible elements 504 can expand, stretch, and/or compress such that the elastic portion 502 acts like a spring to elongate and shorten as the voice coil 304 moves axially along the central axis 208. The spring-like structure can have turns that are foldable, or fold in the axial direction onto themselves. For example, the elastic portion 502 can include a helical portion having several turns that can expand, stretch, or compress in the vertical direction (FIGS. 6A-6B). As described below, the helical portion can have a helical geometry, wound in a Z-direction, to provide this spring-like characteristic. It will be appreciated that stress may be uniformly distributed along the helical geometry, resulting in lower localized stresses in the compressible element 504 and reduced likelihood of failure.

The elastic portion 502 of the lead wire 308 can allow the voice coil 304 to oscillate freely in the Z-direction by expanding and collapsing upon itself. The elastic portion 502 can also reduce the transverse footprint of the lead wire 308. For example, by locating the entire vertical portion of the lead wire 308, e.g., the entire compressible portion, within the cavity 404, the lead wire 308 does not have to be routed behind the side magnet 402. Thus, the gap 312 that is needed for the lead wire 308 in FIG. 3 is not required in FIG. 4. More particularly, there may still be the gap 312, but the width of the gap 312 may be less than the width required to route the lead wire 308 through the gap 312. Accordingly, a larger side magnet 402 may be used, resulting in improved acoustic performance, or the side wall of the speaker housing 202 may be moved radially inward, reducing an overall footprint of the loudspeaker 102. In either case, the available space in the speaker housing 202 may be better utilized and improvements may be achieved without sacrificing function of the lead wire 308. That is, the elastic portion 502 of the lead wire 308 in FIG. 4 can serve the same electrical and mechanical function as the long cantilevered design of the lead wire 308 shown in FIG. 3.

Referring to FIG. 6A, a side view of a lead wire of a loudspeaker is shown in accordance with an aspect. The lead wire 308 extends from the fixed end 310 to the moving end 311 and can include an elastic portion 502 within the cavity 404, as described above. The elastic portion 502 can include a helical portion 601. In an aspect, the one or more compressible elements 504 of the elastic portion 502 include one or more turns of the helical portion 601. More particularly, the helical portion 601 can include one or more turns of the lead wire 308, which spirals about an axis. For example, the helical portion 601 can include at least a top turn 602 and a bottom turn 604, each of which may spiral about the axis. The helical portion 601 can have one or more additional turns between the top turn 602 and the bottom turn 604. The turns of the helical portion 601 can have respective pitches in the axial direction, which may be the same or different. The pitches of the turns can expand and compress such that the helical portion 601 acts like a spring that elongates and contracts as the voice coil 304 and the diaphragm 204 oscillate along the central axis 208.

The helical portion 601 can have a helical shape with a constant helix diameter. More particularly, a diameter of the turns in the transverse direction may be the same. When the moving end 311 moves relative to the fixed end 310, such as when the voice coil 304 oscillates within the magnetic gap, the coil of the helical portion 601 can expand or compress in the vertical direction. This expansion/compression allows the turns to move away from and toward each other to facilitate voice coil motion while delivering the electrical audio input signal from the speaker terminal 406 to the voice coil 304.

Referring to FIG. 6B, a side view of a lead wire of a loudspeaker is shown in accordance with an aspect. The helical portion 601 may have a varied diameter. For example, the helical portion 601 can include a conic helical portion 605. The conic helical portion 605 may be a tapered helix, otherwise known as a castellated helix, having one or more turns of different diameters. For example, the conic helical portion 605 of the lead wire 308 can have the top turn 602 that includes a different diameter in the transverse direction than the bottom turn 604. As shown in FIG. 6B, the top turn 602 can have a larger diameter than the bottom turn 604. Alternatively, the bottom turn 604 may have a larger diameter than the top turn 602.

Figure 6C:
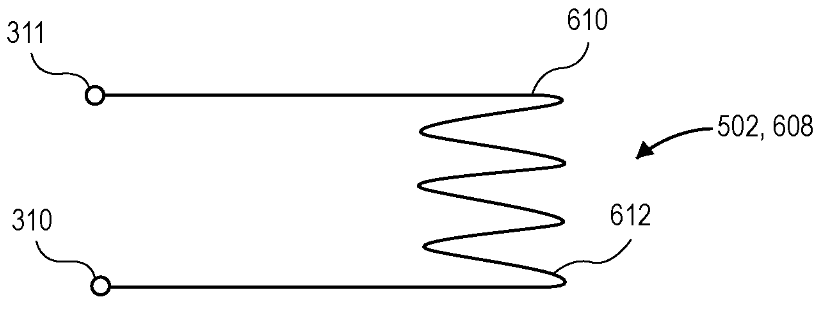

Referring to FIG. 6C, a side view of a lead wire of a loudspeaker is shown in accordance with an aspect. The elastic portion 502 of the lead wire 308 may have a non-helical configuration. More particularly, the elastic portion 502 can have a spring-like configuration that is not helical. In an aspect, the elastic portion 502 includes an undulating portion 608. The undulating portion 608 may have a zig-zag configuration, extending between a top undulation 610 and a bottom undulation 612. Like the helical portion 601, the undulating portion 608 may include one or more additional undulations between the top undulations 610 and the bottom undulation 612. Each undulation can have one or more bends. The bends of the elastic portion 502 can be generally in a same plane. For example, the compressible elements (undulations) can be stacked such that the bends are aligned within a vertical plane. Accordingly, like the helical portion 601, when the voice coil 304 oscillates in the vertical direction, the undulating portion 608 can compress and expand in an accordion fashion to facilitate relative movement between the moving end 311 and the fixed end 310.

As described above, the elastic portion 502 of the lead wire 308 can have a helix, tapered helix (castellated), or undulating shape. The shapes provide for axial compression/expansion of the elastic portion 502 to provide a spring-like function. Accordingly, the elastic portion 502 of the lead wire 308 can be fabricated using coil winding machines. For example, to create the helical wire loop, the lead wire can be wound about a pin having a constant or tapered diameter. The pin can be a cylindrical pin or a pin having a castellated geometry of descending diameter. Thus, each time the lead wire 308 is wrapped around the pin, the elastic portion 502 can take the shape of the outer surface of the pin, resulting in a constant or tapered helix diameter. Similarly, the undulating shape can be achieved by wrapping the lead wire 308 back and forth over pins that create a zig-zag shape of the elastic portion 502.

Figure 7:
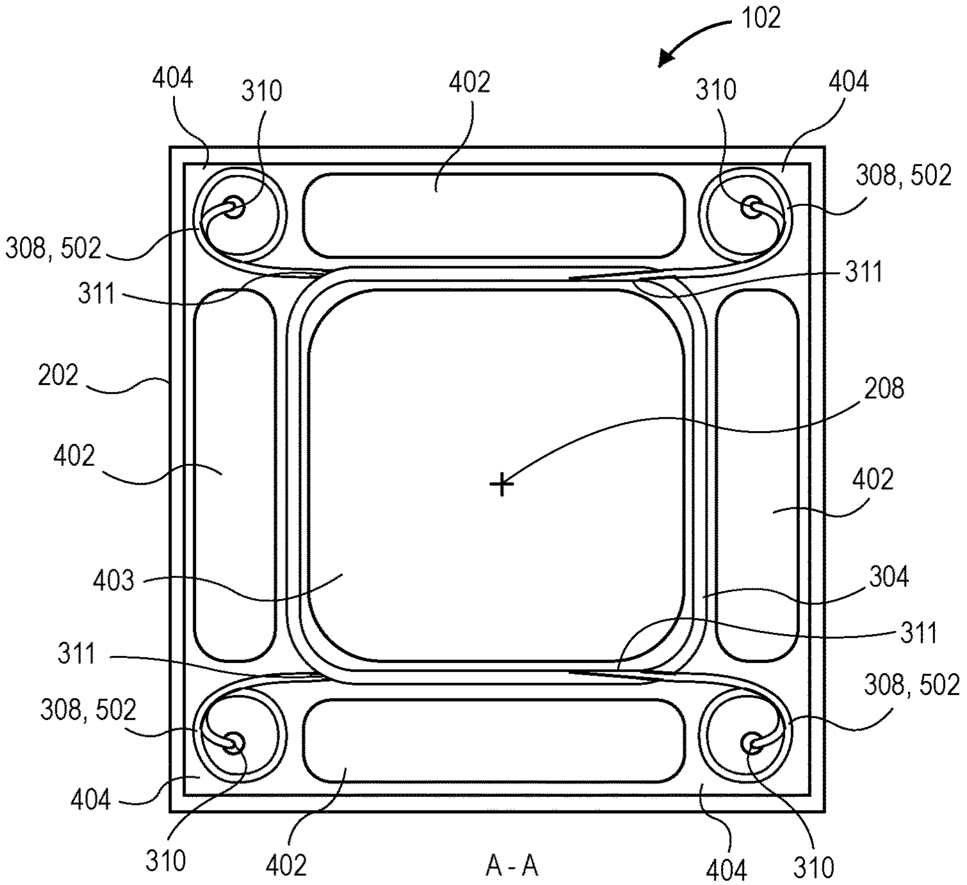
FIG. 7 is a cross-sectional view, taken about line A-A of FIG. 2, of a loudspeaker motor system, in accordance with an aspect.

Referring to FIG. 7, a cross-sectional view, taken about line A-A of FIG. 2, of a loudspeaker motor system is shown in accordance with an aspect. In addition to facilitating vertical movement of the voice coil 304, the lead wire 308 can stabilize the moving voice coil 304. In an aspect, the loudspeaker 102 includes several lead wires 308 that extend between respective fixed ends 310 and moving ends 311. For example, the several lead wires 308 may have respective elastic portions 502 (such as helical portions 601), and the respective elastic portions 502 can be spaced around the voice coil 304.

In an aspect, the respective elastic portions 502 of several lead wires 308 are evenly spaced around the voice coil 304. For example, the speaker housing 202 may have a rectangular cross-sectional profile, and thus, may include four corners evenly spaced or distributed about the central axis 208. Each corner can define a respective cavity 404 between the speaker housing 202, the voice coil 304, and side magnets 402. The cavities can be evenly distributed about the central axis 208, and thus, the respective elastic portions 502 within the cavities can distribute the suspension of the voice coil 304 within the speaker housing 202. More particularly, the movement of the voice coil 304 can apply loading to the elastic portions 502 that are evenly distributed about the central axis 208, and thus, the reaction loads applied to the voice coil 304 can be distributed. The distributed loading can reduce a likelihood of non-vertical loading on the voice coil 304, and thus, can reduce rocking modes of the voice coil 304. By reducing rocking modes, speaker stability and acoustic performance can be improved.

Figure 8:
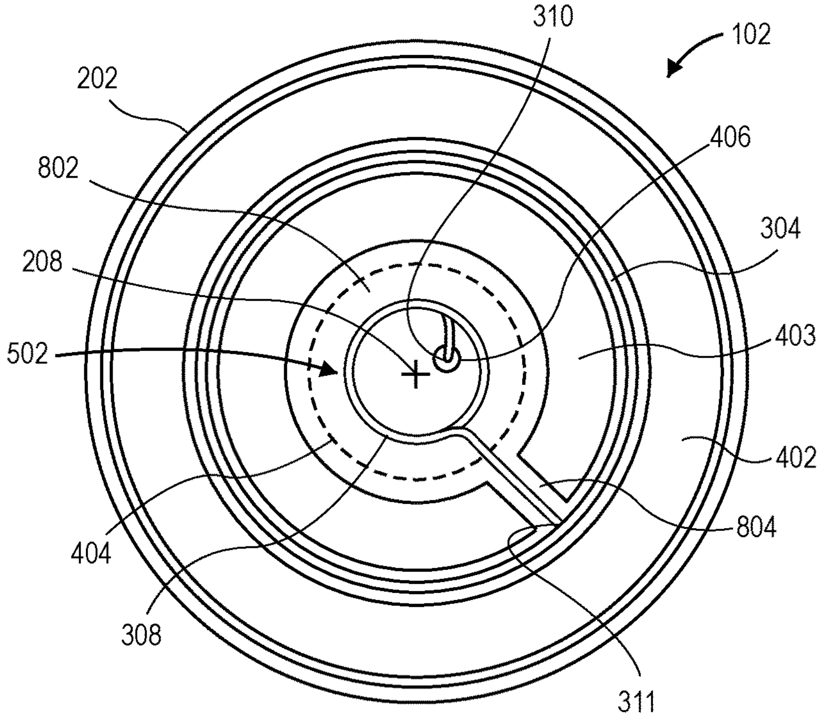
FIG. 8 is a cross-sectional view of a loudspeaker motor system, in accordance with an aspect.

Referring to FIG. 8, a cross-sectional view of a loudspeaker motor system is shown in accordance with an aspect. The motor system 302 may include a non-rectangular layout. For example, rather than having a voice coil 304, center magnet 403, and one or more side magnets 402 laid out in a rectangular configuration, the voice coil 304, center magnet 403, and one or more side magnets 402 may have a circular layout. In the circular layout, the speaker housing 202 may lack corners, and thus, there may be no cavities 404 between the speaker housing 202 and the side magnet 402 to receive the elastic portion(s) 502 of the lead wire 308.

In an aspect, the loudspeaker 102 includes a hole 802 in the center magnet 403 to receive the elastic portion 502 of the lead wire 308. The hole 802 can extend along the central axis 208 from a top surface of the center magnet 403 to a bottom surface of the center magnet 403. Accordingly, the hole 802 can provide the cavity 404 within which the helical portion 601 or any other elastic portion 502 of the lead wire 308 is disposed within. The helical portion 601 within the hole 802 can expand and compress as described above. In an aspect, the lead wire 308 can extend radially from the elastic portion 502 to the voice coil 304 through a discontinuity 804 in the center magnet 403. Discontinuity 804 provides a channel for the radial length of the lead wire 308 to extend into contact with the voice coil 304. Accordingly, the lead wire 308 can deliver the electrical audio input signal from the speaker terminal 406 to the voice coil 304.

Figure 9:
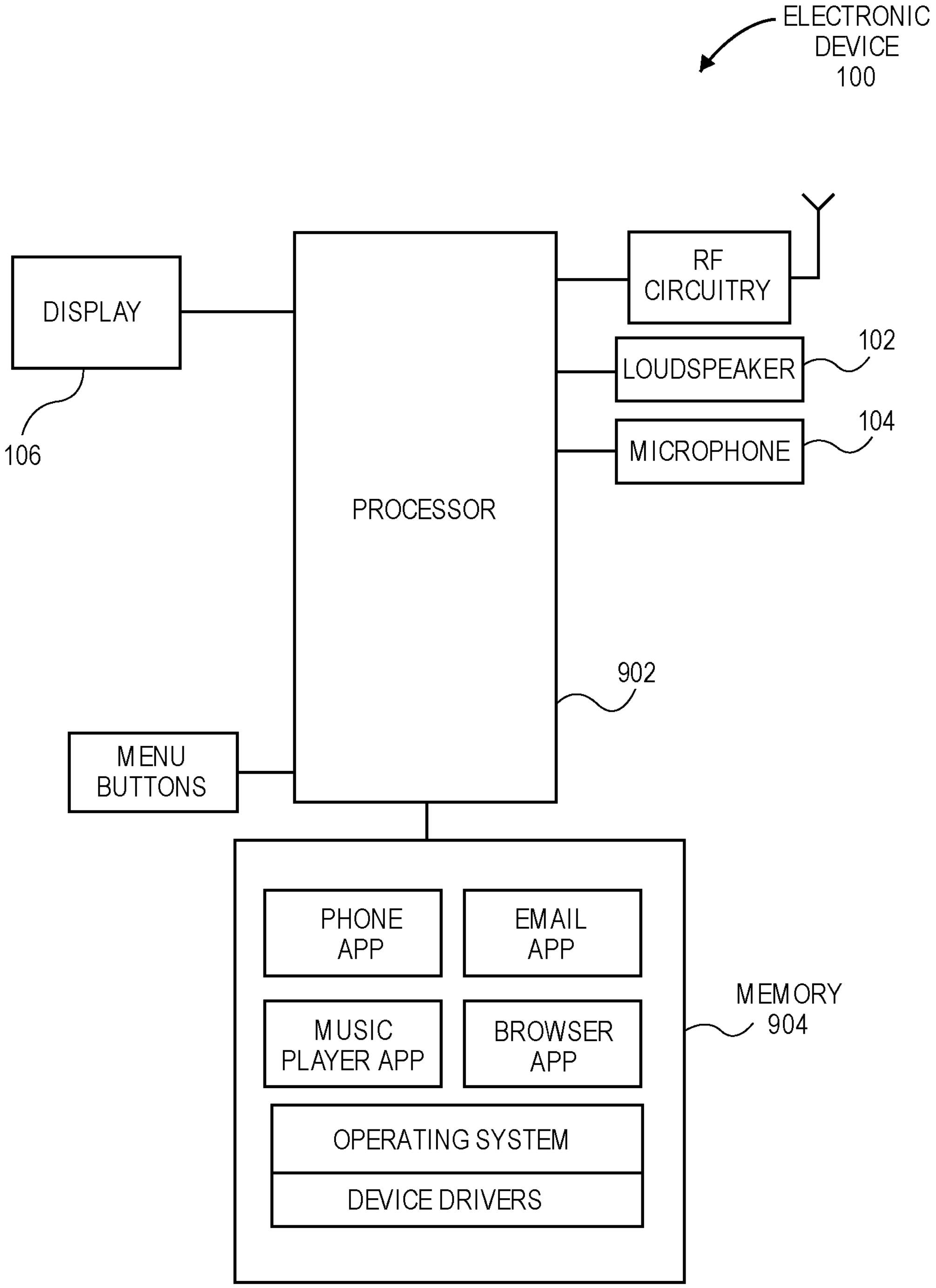
FIG. 9 is a block diagram of an electronic device having a loudspeaker, in accordance with an aspect.

Referring to FIG. 9, a block diagram of an electronic device having a loudspeaker is shown in accordance with an aspect. As described above, the electronic device 100 can have circuitry suited to specific functionality. For example, the electronic device 100 can include the device housing to contain or support various components, such as cellular network communication circuitry, e.g., RF circuitry, menu buttons, or the display 106. The diagram circuitry of FIG. 9 is provided by way of example and not limitation. The electronic device 100 may include one or more processors 902 that execute instructions to carry out the different functions and capabilities described above. For example, a processor 902 may incorporate and/or communicate with electronics connected to the loudspeaker 102 to provide electrical audio input signals to drive the voice coil 304 and to generate sound. Instructions executed by the one or more processors 902 of the electronic device 100 may be retrieved from a local memory 904. The instructions may be in the form of an operating system program having device drivers, as well as one or more application programs that run on top of the operating system, to perform the different functions introduced above, e.g., music playback. Audio output for music playback functions may be through an audio speaker, such as the loudspeaker 102.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A loudspeaker, comprising:
a speaker housing;
a diaphragm coupled to the speaker housing;
a motor system to cause motion of the diaphragm in an axial direction, wherein the motor system includes a voice coil coupled to the diaphragm, a center magnet and one or more side magnets; and
a lead wire connected to the voice coil, wherein the lead wire includes an elastic portion having a plurality of compressible elements configured to extend and compress in the axial direction, wherein the compressible elements comprise at least a top turn and a bottom turn having different diameters that together form a tapered helical portion.

2. The loudspeaker of claim 1, wherein the top turn and the bottom turn have a same pitch.

3. The loudspeaker of claim 1, the voice coil and the center magnet are coaxial along a central axis.

4. The loudspeaker of claim 3 further comprising a gap radially between one of the one or more side magnets and the speaker housing, wherein the lead wire does not extend through the gap.

5. The loudspeaker of claim 3 further comprising a cavity defined between the speaker housing, the voice coil, and the one or more side magnets, wherein the elastic portion of the lead wire is within the cavity.

6. The loudspeaker of claim 5 further comprising a plurality of lead wires including the lead wire, wherein the plurality of lead wires have respective elastic portions, and wherein the respective elastic portions are spaced around the voice coil.

7. The loudspeaker of claim 6, wherein the respective elastic portions of the plurality of lead wires are evenly spaced around the voice coil.

8. The loudspeaker of claim 3 further comprising a hole in the center magnet along the central axis, wherein the elastic portion of the lead wire is within the hole.

9. A loudspeaker, comprising:
a speaker housing;
a diaphragm coupled to the speaker housing;
a motor system to cause motion of the diaphragm in an axial direction, wherein the motor system includes a voice coil coupled to the diaphragm and one or more side magnets extending around the voice coil; and
a plurality of lead wires connected to the voice coil, wherein each lead wire of the plurality of lead wires includes an elastic portion extending vertically within a cavity defined between the speaker housing, the voice coil, and the one or more side magnets, and
wherein the elastic portion comprises a helical portion having a varied helix diameter.

10. The loudspeaker of claim 9, wherein the helical portion is within the cavity.

11. The loudspeaker of claim 9, wherein the helical portion includes a plurality of turns having a different pitch.

12. The loudspeaker of claim 9 further comprising a gap radially between one of the one or more side magnets and the speaker housing, wherein the lead wire does not extend through the gap.

13. The loudspeaker of claim 9 wherein the respective elastic portions are spaced around the voice coil.

14. The loudspeaker of claim 13, wherein the respective elastic portions are evenly spaced around the voice coil.

15. An electronic device, comprising:
a device housing; and
a loudspeaker coupled to the device housing, the loudspeaker comprising:
a speaker housing,
a diaphragm coupled to the speaker housing,
a motor system to cause motion of the diaphragm in an axial direction, wherein the motor system includes a voice coil coupled to the diaphragm, a center magnet coaxial with the voice coil and having a hole along a central axis, and one or more side magnets, and
a lead wire connected to the voice coil, wherein the lead wire includes an elastic portion having a plurality of turns that form a helical portion configured to extend and compress in the axial direction, and the helical portion is within the hole.

16. The electronic device of claim 15, wherein the plurality of turns comprise a top turn and a bottom turn having a same diameter.

17. The electronic device of claim 15, wherein the voice coil and the center magnet are coaxial along the central axis.

18. The electronic device of claim 17 further comprising a gap radially between one of the one or more side magnets and the speaker housing, wherein the lead wire does not extend through the gap.

19. The electronic device of claim 15 wherein the plurality of turns comprise a top turn and a bottom turn having a same pitch.

20. The electronic device of claim 15 wherein the plurality of turns comprise a top turn and a bottom turn, and the top turn having a larger diameter than the bottom turn.

* * * * *